Nov. 12, 1963 S. R. WEBB 3,110,821

*n* PULSE COUNTER USING AT MOST 3*n* NOR ELEMENTS FOR ODD *n* AND 3*n*/2 ELEMENTS FOR EVEN *n*

Filed Jan. 9, 1962 2 Sheets-Sheet 1

WITNESSES

Leon J. Laza

James F. Young

INVENTOR

Stephen R. Webb

BY R. W. Brodahl

ATTORNEY

| INPUT PULSES | 0 | 1 | 0 | 1 | 0 | 1 | 0 |
|---|---|---|---|---|---|---|---|
| NOR ELEMENTS 1' | 1 | 0 | 0 | 0 | 0 | 0 | 1 |
| 2' | 0 | 0 | 1 | 0 | 0 | 0 | 0 |
| 3' | 0 | 0 | 0 | 0 | 1 | 0 | 0 |
| 4' | 0 | 1 | 0 | 0 | 0 | 0 | 0 |
| 5' | 0 | 0 | 0 | 1 | 0 | 0 | 0 |
| 6' | 0 | 0 | 0 | 0 | 0 | 1 | 0 |
| 7' | 0 | 0 | 0 | 0 | 1 | 1 | 0 |
| 8' | 0 | 0 | 1 | 1 | 0 | 0 | 0 |
| 9' | 1 | 1 | 0 | 0 | 0 | 0 | 1 |

United States Patent Office 3,110,821
Patented Nov. 12, 1963

3,110,821

N PULSE COUNTER USING AT MOST 3N NOR ELEMENTS FOR ODD N AND 3N/2 ELEMENTS FOR EVEN N

Stephen R. Webb, Park Forest, Ill., assignor to Westinghouse Electric Corporation, East Pittsburgh, Pa., a corporation of Pennsylvania Filed Jan. 9, 1962, Ser. No. 165,160
10 Claims. (Cl. 307—88.5)

This invention relates to pulse counter apparatus for counting electrical impulses, and more particularly to ring counters constructed from transistor NOR circuit elements or the like.

As is known, counters, and especially decimal counters, are useful in many control applications employing digital signals where it is desired to determine the number of digits or pulses in a signal. The present invention is particularly concerned with such counters constructed entirely from transistor NOR circuit elements. Previous to this invention, the best $n$-bit NOR counters known used two $n$ plus five NOR elements for the counter itself, and in addition, used five extra NOR elements and two capacitors for a pulse shaper. Because of the use of capacitors and the large number of required NOR elements, such counters were relatively slow in operation and expensive to construct.

Accordingly, as an overall object, the present invention seeks to provide a new and improved transistor NOR element counter which employs no capacitors, has fewer circuit components and, consequently, is much faster in operation than NOR element counters heretofore known.

Another object of the invention is to provide a transistor NOR element ring counter which, for $n$ bits or pulses, uses at most $3n$ NOR elements for odd $n$, and $3n/2$ elements for even $n$.

A further object of the invention is to provide a transistor NOR element ring counter which will count both complete input pulses as well as the number of changes of state of the input signal. Thus, if the counter will count two pulses or bits, for example, it will also count the four changes in the input signal which produced the two pulses.

Still another object of the invention is to provide a NOR element ring counter which has any even number of states $n$ which follow each other in such a way that, calling any given state the "first" state, the counter will attain each of the $n$ states and then return to the first state after the $n$th state as input signals are applied.

In accordance with the invention, hereinafter described in detail, any number of pulses may be counted by an appropriate combination of NOR circuit elements interconnected in conformity with a formula or matrix notation which may be used to determine the number of NOR elements and the connections between those elements for the particular pulse count. Using the matrix notation mentioned above, the number of required NOR elements in a single ring counter will be three times the number of pulses counted. For most large numbers of odd pulse counts this will require a correspondingly large number of NOR circuit elements. However, for even numbers of pulses, a high count can be effected with a much smaller number of circuit elements by connecting rings of relatively few NOR elements in series. For example, it will be shown that in order to count twelve pulses, thirty-six NOR elements may be used in a single ring counter configuration; or, alternatively, two simpler two-pulse counters and a three-pulse counter may be connected in series to effect the same result using only twenty-one elements. For eleven pulses, however, a single ring counter of thirty-three elements must be used.

The above and other objects and features of the invention will become apparent from the following detailed description taken in connection with the accompanying drawings which form a part of this specification, and in which.

Figure 1:
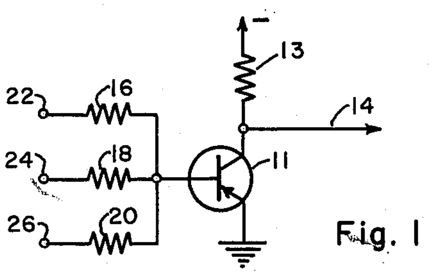
FIGURE 1 is a detailed schematic circuit diagram of a NOR circuit element of the type used in the present invention.

Referring now to FIG. 1, a typical NOR circuit element is shown and includes a PNP junction transistor 11 having its emitter grounded and its collector connected through resistor 13 to a source of negative voltage, not shown, the arrangement being such that when the transistor 11 is cut off, a high negative voltage will appear on output lead 14. When the transistor conducts, however, it will act as a closed switch so that the output lead 14 will be essentially at ground potential.

Connected to the base of the transistor 11 are three input leads each having a resistor 16, 18 or 20 therein. The circuit is such that the transistor will normally be cut off, whereby a high negative voltage will appear on output lead 14. When, however, a negative input signal is applied to any one of the input terminals 22, 24 or 26, transistor 11 will be driven to saturation so that the voltage on output lead 14 rises until it assumes ground potential. Furthermore, the transistor 11 will conduct to raise the voltage on output lead 14 regardless of whether one, two or three negative input signals are applied to the terminals 22, 24 and 26. When the transistor 11 is cut off and a high negative voltage appears on lead 14, the NOR circuit is said to be "On"; whereas, whenever a negative input signal is applied to any one of the leads 22–26 and the transistor 11 conducts to raise the voltage on output lead 14, the NOR circuit is said to be "Off." From a consideration of the circuit, it will be seen that the illustration of three input terminals is for purposes of explanation only, it being understood that the number of input terminals will depend upon the number of input signals and may extend from one up to any practical number.

When two NOR circuit elements such as that of FIG. 1 are connected in cascade such that the output lead 14 of one circuit is connected to one of the terminals 22–26 of a succeeding circuit, it can be seen that if the first NOR element is On, then the second or succeeding NOR element must be Off. In like manner, when the first NOR element is Off, the second NOR element will be On, assuming that there are only two NOR elements involved. If, however, three NOR elements are connected to the respective input terminals 22, 24 and 26 of the circuit of FIG. 1, then the circuit will be switched from an On condition to an Off condition whenever any one of the three NOR elements connected to the terminals 22, 24 and 26 is On so that a negative voltage is applied to its associated terminal.

In the claims which follow this specification, the terminals 22, 24 and 26 are referred to as the "input" to a NOR element; whereas lead 14 is referred to as the "output." Therefore, whenever one or more signals are "applied to the input" of the NOR element, they may be applied to any one or more of the terminals 22–26 or, for that matter, to any number of input terminals depending upon the specific construction of the NOR element.

Figure 2:
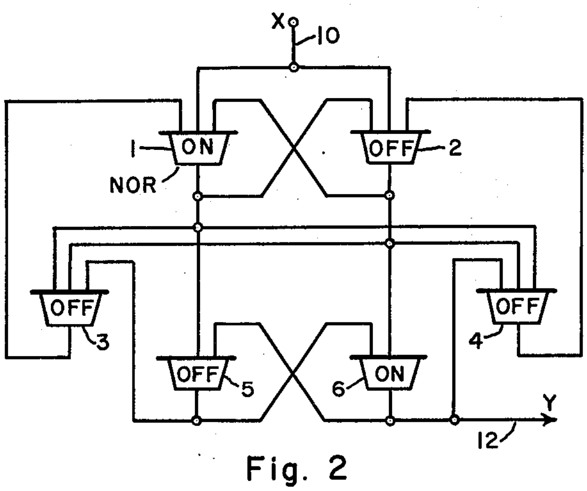
FIG. 2 is a block schematic circuit diagram of a two-pulse counter constructed in accordance with the teachings of the present invention.

Referring now to FIG. 2, a two-pulse counter constructed in accordance with the teachings of the present invention is shown and includes six NOR elements numbered 1 through 6. The normal states of the NOR elements without any input pulses applied to the circuit are as shown. Thus, whereas the NOR element 1 is On, NOR element 2 must be Off since the output of element 1 is connected to the input of element 2. Similarly, elements 3, 4 and 5 must all be Off since the output of the On element 1 is connected to their inputs. The element 6, however, will be On since it has only Off signals applied thereto from elements 2 and 5. Input pulses to be counted are applied to terminal 10; whereas the output is taken from lead 12 at the output of NOR element 6.

Figure 2A:
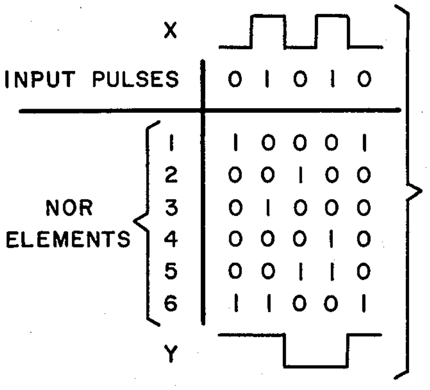
FIG. 2A is a table illustrating the state each element of FIG. 2 is in as the input variable goes through a complete cycle.

In FIG. 2A, a table is shown which lists the On or Off state, represented by 1 and 0, respectively, which each element is in as the input variable goes through a complete cycle. Thus, the input variable (waveform X) may comprise a pair of pulses. As shown in the table, before any input pulses are applied to the circuit, the number 1 and number 6 NOR elements will be On while the others are Off. When the input signal changes from an Off condition to an On condition, however, element 1 will switch Off since it now has an On signal applied thereto from terminal 10 whereas element 3 will switch On since it now has only Off signals applied thereto from elements 1, 2 and 5. When the input variable again switches Off to produce the first pulse in waveform X, NOR element 2 will switch On, and NOR element 6 will switch Off to switch On NOR element 5. In a similar manner, when the input variable again switches On to produce the second pulse, elements 4 and 5 will switch On while all of the other elements are Off. When the input variable again switches Off, the cycle is repeated, meaning that elements 1 and 6 are again On while the remaining elements are Off. The resulting output waveform Y is thus a single pulse for the two input pulses in waveform X. That is, a single output pulse will be produced on output lead 12 for every two input pulses applied to terminal 10. It will be noted from FIG. 2A that only one of the elements 1 through 4 is On at a given time. Thus, these first elements 1 through 4 count the number of changes in the input variable applied to terminal 10. Elements 5 and 6 in FIG. 2, however, will count the number of input pulses. In this respect, although the output is taken from NOR element 6, it could also be taken from NOR element 5, the difference being that one signal is the complement of the other.

Figure 3:
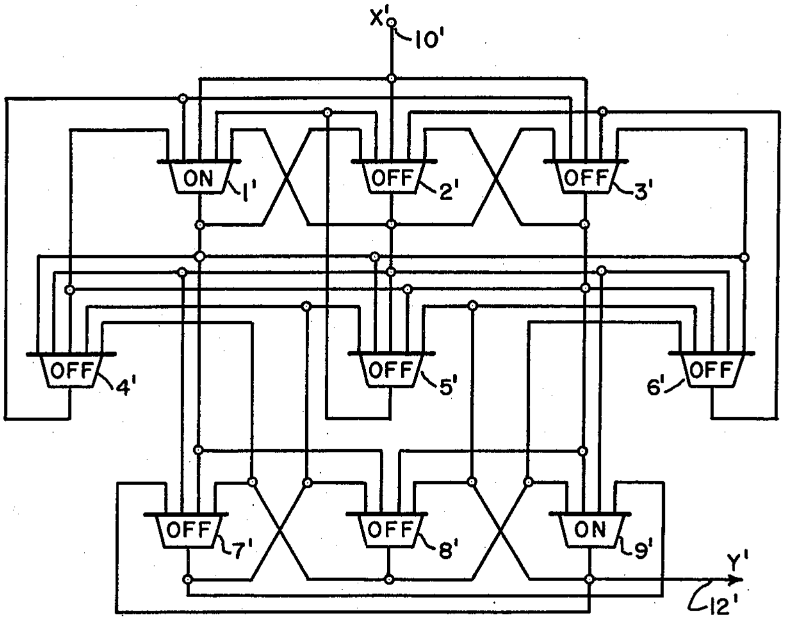
FIG. 3 is a block schematic diagram of a three-pulse counter constructed in accordance with the teachings of the invention.
Figure 3A:
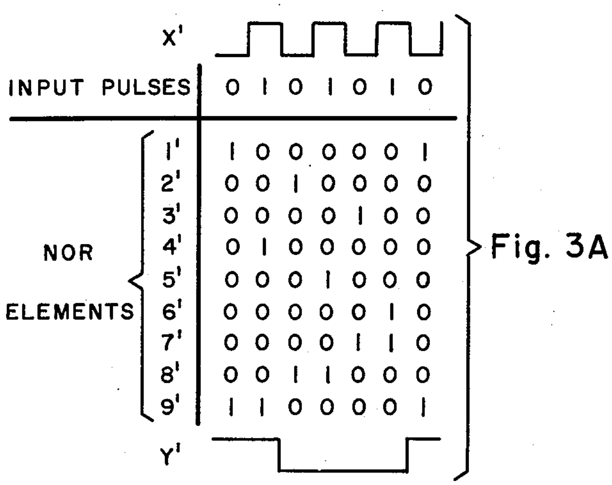
FIG. 3A is a table, similar to that of FIG. 2A, illustrating the state each element of FIG. 3 is in as the input variable goes through a complete cycle.

In FIG. 3 a three-pulse or six-change counter is shown which includes nine NOR circuit elements numbered 1′ through 9′. Under normal conditions, with no input pulses applied to the input terminal 10′, NOR elements 1′ and 9′ will be On while the remaining NOR elements will be Off. This is shown, for example, in the table of FIG. 3A. When the input variable on terminal 10′ switches On, however, NOR element 1′ will switch Off whereas NOR element 4′ will switch On and NOR element 9′ will remain On. When the input variable again switches Off, NOR element 2′ will switch On, and then NOR element 4′ will switch Off, NOR element 9′ will switch Off, and NOR element 8′ will switch On. The states of the various NOR element of the circuit of FIG. 3 for every change in the input variable can be readily understood from an examination of the table of FIG. 3A. In a manner similar to the circuit of FIG. 2, the first six NOR elements of the circuit of FIG. 3 count the number of changes in the input variable since only one of these elements is On at a given time. The last three elements of FIG. 3, namely, NOR elements 7′, 8′ and 9′, however, count the number of input pulses. That is, the output waveform Y′ comprises a single output pulse for every three input pulses in the input waveform X′. Furthermore, the output waveform may be derived from any one of the NOR circuit elements 7′, 8′ or 9′, the only difference being in the phase of the output signal.

The circuits of FIGS. 2 and 3 may be represented by matrix notation for the NOR circuits. Each circuit may be represented by a $(K+1)$ by K matrix, where K is the number of elements in the circuit; $K+1$ is the number of horizontal rows in the matrix; and K is the number of vertical columns in the matrix. Thus, for the circuit of FIG. 2, where K is six, the matrix may be represented as follows:

| | 1 | 2 | 3 | 4 | 5 | 6 |
|---|---|---|---|---|---|---|
| $x$ | 1 | 1 | 0 | 0 | 0 | 0 |
| 1 | 0 | 1 | 1 | 1 | 1 | 0 |
| 2 | 1 | 0 | 1 | 1 | 0 | 1 |
| 3 | 1 | 0 | 0 | 0 | 0 | 0 |
| 4 | 0 | 1 | 0 | 0 | 0 | 0 |
| 5 | 0 | 0 | 1 | 0 | 0 | 1 |
| 6 | 0 | 0 | 0 | 1 | 1 | 0 |

In the foregoing matrix, the output of an element represented by a horizontal row is connected to the input of an element represented by a vertical column where a 1 appears at the junction of the row and column. Thus, in the foregoing matrix, it will be seen that the output of NOR element 3 is connected to the input of NOR element 1. Similarly, the output of NOR element 2 is connected to the inputs of NOR elements 1, 3, 4 and 6. The first row in the matrix, designated "*x*," corresponds to the input variable or signal and shows that it is connected to NOR elements 1 and 2 only.

The matrix representing the circuit of FIG. 3 will appear as follows:

| | 1′ | 2′ | 3′ | 4′ | 5′ | 6′ | 7′ | 8′ | 9′ |
|---|---|---|---|---|---|---|---|---|---|
| $x$ | 1 | 1 | 1 | 0 | 0 | 0 | 0 | 0 | 0 |
| 1′ | 0 | 1 | 1 | 1 | 1 | 1 | 1 | 1 | 0 |
| 2′ | 1 | 0 | 1 | 1 | 1 | 1 | 1 | 0 | 1 |
| 3′ | 1 | 1 | 0 | 1 | 1 | 1 | 0 | 1 | 1 |
| 4′ | 1 | 0 | 1 | 0 | 0 | 0 | 0 | 0 | 0 |
| 5′ | 1 | 1 | 0 | 0 | 0 | 0 | 0 | 0 | 0 |
| 6′ | 0 | 1 | 1 | 0 | 0 | 0 | 0 | 0 | 0 |
| 7′ | 0 | 0 | 0 | 1 | 1 | 0 | 0 | 1 | 1 |
| 8′ | 0 | 0 | 0 | 1 | 0 | 1 | 1 | 0 | 1 |
| 9′ | 0 | 0 | 0 | 0 | 1 | 1 | 1 | 1 | 0 |

Here, again, the first row "*x*" corresponds to the input variable; whereas the output of a NOR element in a horizontal row is connected to the input of an element in a vertical column when a 1 appears at the intersection of the row and column. For example, the matrix indicates that the output of NOR element 3′ is connected to the inputs of elements 1′, 2′, 4′, 5′, 6′, 8′ and 9′. Likewise, the matrix indicates that the output of element 4′ is connected to the inputs of elements 1′ and 3′, and so on. This, of course, can be verified from an examination of FIG. 3.

In accordance with the present invention, it has been found that any ring counter adapted to count a predetermined number of pulses may be represented by a generalized $n$-pulse ring counter. Thus, the circuit for a generalized $n$-pulse (or $2n$-change) ring counter may be represented by the following $(3n+1)$ by $3n$ matrix:

| $x$ | $1 \ldots n$<br>$a$ | $n+1 \ldots 2n$<br>$o$ | $2n+1 \ldots 3n$<br>$o$ |
|---|---|---|---|
| $1 \ldots n$ | A | B | C |
| $n+1 \ldots 2n$ | D | O | O |
| $2n+1 \ldots 3n$ | O | C | A |

where $a$ is a 1 by $n$ matrix within a matrix consisting entirely of ones; $o$ is a 1 by $n$ matrix within a matrix consisting entirely of zeroes; A is an $n$ by $n$ matrix within a matrix consisting of ones, except with zeros down the main diagonal from the upper left-hand corner to the lower right-hand corner; B is an $n$ by $n$ matrix within a matrix consisting entirely of ones; C is an $n$ by $n$ matrix within a matrix consisting of ones, except with zeros down the opposite diagonal from the upper right-hand corner to the lower left-hand corner; D is an $n$ by $n$ matrix within a matrix similar to A, except that the first row of the matrix A is written last, and all other rows of matrix A are moved up one; and O is an $n$ by $n$ matrix within a matrix consisting entirely of zeros.

When $n$ is 2, a matrix assembled in accordance with the foregoing rules will be the same as the matrix outlined above for FIG. 2. Similarly, when $n$ is 3 the resulting matrix will appear as that outlined above for the circuit of FIG. 3. By employing the proper value for $n$, any counter can be easily constructed by merely following the rules outlined above for connecting $3n$ NOR elements, where it is desired to count $n$ pulses.

Although $3n$ NOR elements may be interconnected in accordance with the foregoing generalized matrix to count any number of pulses, lower-ordered counters may be connected in series to count a high even number of pulses with relatively few NOR elements. For example, in order to count twelve pulses, thirty-six NOR elements may be used in accordance with the foregoing matrix requiring $3n$ elements. Alternatively, two two-pulse counters and a three-pulse counter may be connected in series, using only twenty-one elements with the same overall effect. In fact, if it is desired to count $n$ pulses, we may completely factor $n$ into its prime factors, and connect in series counters for the prime factors. The following table lists the number of elements necessary to count any number $n$ of pulses through twenty:

| No. of pulses | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|
| No. of elements | 6 | 9 | 12 | 15 | 15 | 21 | 18 | 18 | 21 | 33 | 21 | 39 | 27 | 24 | 24 | 51 | 24 | 57 | 27 |

The present invention thus provides transistor NOR element counter circuits which use fewer elements than counters previously known, will count changes of state as well as the number of input pulses, can be connected in series to count a high even number of input pulses with relatively few elements, and use no capacitors so as to eliminate any time delay.

Although the invention has been shown in connection with a certain specific embodiment, it will be readily apparent to those skilled in the art that various changes in form and arrangement of parts may be made to suit requirements without departing from the spirit and scope of the invention.

I claim as my invention:

1. Pulse counter apparatus for producing an output pulse in response to $n$ input pulses comprising $3n$ NOR elements interconnected in accordance with the following $(3n+1)$ by $3n$ matrix:

| $x$ | $1 \ldots n$<br>$a$ | $n+1 \ldots 2n$<br>$o$ | $2n+1 \ldots 3n$<br>$o$ |
|---|---|---|---|
| $1 \ldots n$ | A | B | C |
| $n+1 \ldots 2n$ | D | O | O |
| $2n+1 \ldots 3n$ | O | C | A |

wherein each of the horizontal rows in the matrix except the first designated $x$ represents a NOR element in the apparatus, each of the vertical columns in the matrix represents a corresponding NOR element identified by the same numerical number, the output of a NOR element in a horizontal row is connected to the input of an element in a vertical row where a 1 appears at the intersection of the column and row representing the respective NOR elements, $a$ is a 1 by $n$ matrix within the first-mentioned matrix consisting entirely of ones, $o$ is a 1 by $n$ matrix within the first-mentioned matrix consisting entirely of zeros, A is an $n$ by $n$ matrix within the first-mentioned matrix consisting of ones except with zeros down the main diagonal from the upper left-hand corner to the lower right-hand corner, B is an $n$ by $n$ matrix within the first-mentioned matrix consisting entirely of ones, C is an $n$ by $n$ matrix within the first-mentioned matrix consisting of ones, except with zeros down the diagonal from the upper right-hand corner to the lower left-hand corner, D is an $n$ by $n$ matrix within the first-mentioned matrix similar to A except that the first row of A is written last and all other rows of A are moved up one row, and O is an $n$ by $n$ matrix within the first-mentioned matrix consisting entirely of zeros.

2. Pulse counter apparatus for producing an output pulse in response to $n$ input pulses comprising $3n$ switching elements interconnected in accordance with the following $(3n+1)$ by $3n$ matrix:

| $x$ | $1 \ldots n$ <br> $a$ | $n+1 \ldots 2n$ <br> $o$ | $2n+1 \ldots 3n$ <br> $o$ |
|---|---|---|---|
| $1 \ldots n$ | A | B | C |
| $n+1 \ldots 2n$ | D | O | O |
| $2n+1 \ldots 3n$ | O | C | A |

wherein each of the horizontal rows in the matrix except the first designated $x$ represents a switching element in the apparatus, each of the vertical columns in the matrix represents a corresponding switching element identified by the same numerical number, the output of a switching element in a horizontal row is connected to a switching element in a vertical column where a 1 appears at the intersection of the column and the row representing the respective switching elements, $a$ is a 1 by $n$ matrix consisting entirely of ones, 0 is a 1 by $n$ matrix consisting entirely of zeros, A is an $n$ by $n$ matrix consisting of ones except with zeros down the main diagonal from the upper left-hand corner to the lower right-hand corner, B is an $n$ by $n$ matrix consisting entirely of ones, C is an $n$ by $n$ matrix consisting of ones, except with zeros down the diagonal from the upper right-hand corner to the lower left-hand corner, D is an $n$ by $n$ matrix similar to A except that the first row of A is written last and all other rows of A are moved up one, and O is an $n$ by $n$ matrix consisting entirely of zeros.

3. Pulse counter apparatus for producing an output pulse in response to $n$ input pulses comprising $3n$ electron valves each having an input terminal, an output terminal, and a control electrode therein and interconnected in accordance with the following $(3n+1)$ by $3n$ matrix:

| $x$ | $1 \ldots n$ <br> $a$ | $n+1 \ldots 2n$ <br> $o$ | $2n+1 \ldots 3n$ <br> $o$ |
|---|---|---|---|
| $1 \ldots n$ | A | B | C |
| $n+1 \ldots 2n$ | D | O | O |
| $2n+1 \ldots 3n$ | O | C | A |

wherein each of the horizontal rows in the matrix except the first designated $x$ represents an electron valve in the apparatus, each of the vertical columns in the matrix represents a corresponding electron valve identified by the same numerical number, the output terminal of an electron valve in a horizontal row is connected to the control electrode of an element in a vertical column where a 1 appears at the intersection of the column and the row represents the respective electron valves, $a$ is a 1 by $n$ matrix consisting entirely of ones, $o$ is a 1 by $n$ matrix consisting entirely of zeros, A is an $n$ by $n$ matrix consisting of ones except with zeros down the main diagonal from the upper left-hand corner to the lower right-hand corner, B is an $n$ by $n$ matrix consisting entirely of ones, C is an $n$ by $n$ matrix consisting of ones except with zeros down the diagonal from the upper right-hand corner to the lower left-hand corner, D is an $n$ by $n$ matrix similar to A except that the first row of A is written last and all other rows of A are moved up one, and O is an $n$ by $n$ matrix consisting entirely of zeros.

4. Pulse counter apparatus for counting electrical impulses and adapted to produce one output pulse for every two input pulses applied thereto comprising, in combination, six interconnected NOR circuit elements, means for applying input pulses to be counted to the inputs of two of said NOR elements, and means for deriving output pulses from either one of another two of the NOR elements.

5. Pulse counter apparatus for counting electrical impulses and adapted to produce one output pulse for every two input pulses applied thereto comprising, in combination, six interconnected NOR circuit elements, each of which is adapted to switch between an On or Off binary state, connections between the first two of said NOR elements whereby one element will be On while the other is Off and vice versa, means for applying input pulses to be counted to both of said first two NOR elements, connections between another two of said NOR elements whereby one element will be On while the other is Off and vice versa, and means for deriving an output from either one of said latter-mentioned two NOR elements.

6. In pulse counter apparatus for counting electrical impulses, first and second NOR circuit elements interconnected such that one NOR element will be On while the other is Off and vice versa, third and fourth NOR circuit elements interconnected such that one NOR element will be On while the other is Off and vice versa, fifth and sixth NOR circuit elements, means for applying impulses to be counted to said first and second NOR elements, means connecting the output of said first NOR element to the inputs of said third, fifth and sixth NOR elements, means connecting the output of said second NOR element to the inputs of said fourth, fifth and sixth NOR elements, means connecting the output of the third NOR element to the input of the fifth NOR element, means connecting the output of the fourth NOR element to the input of the sixth NOR element, and means connecting the outputs of the fifth and sixth NOR elements to the inputs of the first and second NOR elements respectively, the arrangement being such that the number of impulses appearing at the outputs of said third and fourth NOR elements will be one half the number applied to said first and second NOR elements.

7. Pulse counter apparatus for counting electrical impulses and adapted to produce one output pulse for every three input pulses applied thereto comprising, in combination, nine interconnected NOR circuit elements, means for applying input pulses to be counted to the inputs of three of said NOR elements, and means for deriving output pulses from any one of another three of the NOR elements.

8. Pulse counter apparatus for counting electrical impulses ad adapted to produce one output pulse for every $n$ input pulses applied thereto comprising, in combination, $3n$ interconnected NOR circuit elements, means for applying input pulses to be counted to the inputs of a first plurality of said NOR elements, and means for deriving output pulses from any one of another plurality of the NOR elements.

9. Pulse counter apparatus for counting electrical impulses and adapted to produce one output pulse for every $n$ input pulses applied thereto comprising, in combination, 3$n$ interconnected NOR circuit elements, means for applying input pulses to be counted to the inputs of $n$ of said NOR elements, and means for deriving output pulses from any one of another $n$ of the NOR elements.

10. Pulse counter apparatus for counting electrical impulses and adapted to produce one output pulse for every $n$ input pulses applied thereto comprising, in combination, 3$n$ interconnected electron valves, each of said valves having an input terminal, an output terminal, and a control electrode, means for applying input pulses to be counted to the control electrodes of $n$ of said electron valves, and means for deriving output pulses from the output terminals of any one of another $n$ of the electron valves.

No references cited.